W. PRELLWITZ.
HAMMER DRILL.
APPLICATION FILED JUNE 15, 1909.
1,057,169.
Patented Mar. 25, 1913.
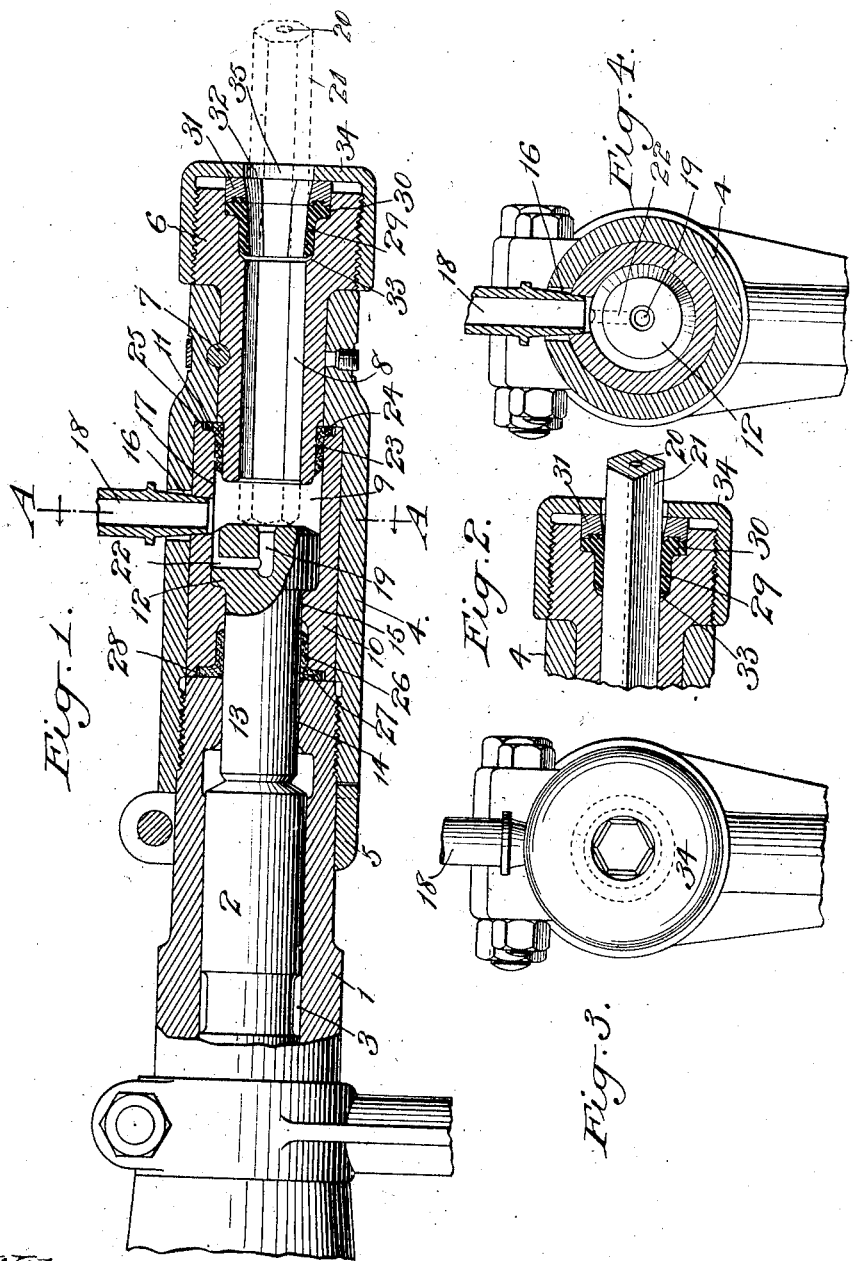
Witnesses:
F. George Barry.
Henry Thieme.
Inventor:
William Prellwitz
by his attorneys
Brown & Seward

UNITED STATES PATENT OFFICE.

WILLIAM PRELLWITZ, OF EASTON, PENNSYLVANIA, ASSIGNOR TO INGERSOLL-RAND COMPANY, OF NEW YORK, N. Y., A CORPORATION OF NEW JERSEY.

HAMMER-DRILL.

1,057,169.  Specification of Letters Patent.  Patented Mar. 25, 1913.

Original application filed February 15, 1909, Serial No. 478,112. Divided and this application filed June 15, 1909. Serial No. 502,254.

*To all whom it may concern:*

Be it known that I, WILLIAM PRELLWITZ, a citizen of the United States, and resident of Easton, in the county of Northampton and State of Pennsylvania, have invented a new and useful Improvement in Hammer-Drills, of which the following is a specification.

This invention relates to hammer drills and has for its object to provide a novel construction at the front end of the drill which will be particularly well adapted for feeding fluid under pressure to a hollow drill steel of common form, fluid-tight connections being provided for the pressure fluid feeding chamber and also between the drill steel and its chuck.

In the accompanying drawings, Figure 1 represents the front end of a hammer drill embodying the invention, the parts being shown partially in side elevation and partially in longitudinal central section; the drill steel being shown in dotted lines in its operative position, Fig. 2 is a detail longitudinal central section at the front end of the drill showing the drill steel in full lines in its position within its chuck, Fig. 3 is a front end view of the drill with the drill steel removed and a portion of the handle broken away, and Fig. 4 is a transverse section taken in the plane of the line A—A of Fig. 1, looking in the direction of the arrows.

The hammer drill cylinder is denoted by 1. It is provided with the usual piston hammer 2 which is fitted to reciprocate in the cylinder chamber 3. The hollow front head 4 is rigidly secured to the front end of the cylinder 1, as, for instance, by being screwed thereon and locked against movement by a clamp ring 5.

The drill steel receiving chuck is denoted by 6, which chuck extends inwardly through the outer end of the front head 4 and it is locked to the front head by any suitable means, such, for instance, as by a cross pin 7. The socket 8 in the chuck for the drill steel extends entirely through the chuck and opens into a pressure fluid feeding chamber 9 within a tube 10 interposed between the front end of the cylinder 1 and an inner shoulder 11 of the front head located a short distance beyond the inner end of the chuck 6.

The head 12 of the anvil block is located within the pressure fluid feeding chamber 9 and its shank 13 extends rearwardly through the tube 10 and reduced front end 14 of the cylinder 1 into the chamber 3 in position to be struck by the hammer piston 2. This tube 10 is provided with an interior annular rib 15 which forms a shoulder against which the inner end of the head 12 of the anvil block abuts.

The front head 4 is provided with a transverse hole 16 in alinement with a transverse hole 17 in the tube 10 for permitting the attachment of a pressure fluid supply pipe 18 for feeding the pressure fluid to the chamber 9.

The head 12 of the anvil block is provided with an axially arranged duct 19 opening through its front end in alinement with the bore 20 of the hollow drill steel 21, which duct 19 is in open communication with the chamber 9 at all times through a branch duct 22.

A cup washer 23 is interposed between the tube 10 and the inner end of the chuck 6 to form a fluid tight packing at this point, the circumferential flange 24 of which washer is seated in an annular recess 25 in the front end of the tube 10. A cup washer 26 is interposed between the tube 10 and the shank 13 of the anvil block to form a fluid tight packing at this point, the circumferential flange 27 of which washer being seated in an annular recess 28 in the inner end of the tube 10.

A fluid tight packing is formed between the drill steel and its chuck at the outer end of the chuck, as follows:—An elastic cup shaped washer 29 has a normally contracted bore of the same cross sectional shape as the drill steel and the socket of the chuck, the circumferential flange 30 of which cup washer is secured to a rigid protecting ring 31, which protecting ring is provided with a flaring bore 32 of the same cross sectional form as the drill steel. The washer 29 and ring 31 are shown as secured together by interlocking their adjacent ends whereby the ring not only acts as a protector for the washer to protect it from injury when the drill steel is inserted into the chuck but also is utilized for the insertion and removal of the said cup washer. The normally contracted bore of the elastic cup washer 29 is preferably formed by tapering the bore from the front to the rear end of the washer. This cup washer 29 and a portion of its protecting ring 31, are seated in a stepped recess 33 in the outer end of the chuck 6 and are removably held in such position in the present instance by providing a screw cap 34 having a central hole 35 for the reception of the drill steel.

It will be seen that by providing a construction as herein shown and described, the pressure fluid feeding chamber 9 is rendered fluid tight and also that a fluid tight connection is provided between the drill steel and its chuck. Furthermore, it will be seen that the parts may be very quickly assembled and disassembled for permitting the renewal of the packings or other parts and also that the device is applicable for use in connection with the common form of drill steel.

By providing the elastic cup washer at the mouth of the chuck with a protecting ring of rigid material, it will be seen that the washer is protected from injury when the drill steel is inserted into the chuck.

The hammer drill structure shown and described but not claimed herein, forms the subject matter of my copending application filed February 15, 1909, Serial No. 478,112, of which this present application is a division.

What I claim is:—

1. A drill steel receiving chuck and a fluid-tight packing for the steel comprising an elastic washer and a rigid protecting ring having their adjacent ends interlocked.

2. A drill steel receiving chuck and a fluid-tight packing for the steel comprising an elastic washer and a rigid protecting ring having their adjacent ends interlocked, the washer having a normally contracted bore.

3. A drill steel receiving chuck and a fluid-tight packing for the steel comprising an elastic washer and a rigid protecting ring having their adjacent ends interlocked, the protecting ring having a flaring bore.

4. A drill steel receiving chuck and a fluid-tight packing for the steel comprising an elastic washer and a rigid protecting ring having their adjacent ends interlocked, the elastic washer having a normally contracted bore and the protecting ring having a flaring bore.

In testimony, that I claim the foregoing as my invention, I have signed my name in presence of two witnesses, this 12th day of June 1909.

WILLIAM PRELLWITZ.

Witnesses:
F. GEORGE BARRY,
C. S. SUNDGREN.